Figure 1:
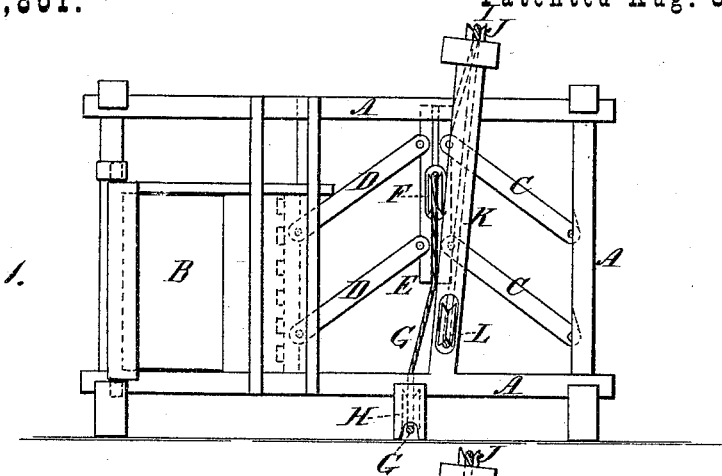

Z. S. FREEMAN.
COTTON AND HAY PRESS.

No. 180,861. Patented Aug. 8, 1876.

Witnesses:
J. West Wagner
J. H. Rutherford

Inventor:
Zach.ʳ S. Freeman
by Johnson & Johnson
Attorneys.

UNITED STATES PATENT OFFICE.

ZACHARIAH S. FREEMAN, OF HUMBOLDT, TENNESSEE.

IMPROVEMENT IN COTTON AND HAY PRESSES.

Specification forming part of Letters Patent No. 180,861, dated August 8, 1876; application filed April 26, 1876.

*To all whom it may concern:*

Be it known that I, ZACHARIAH SHAW FREEMAN, of Humboldt, in the county of Gibson and State of Tennessee, have invented certain new and useful Improvements in Cotton and Hay Press; and I do hereby declare that the following is a full, clear, and exact description thereof, which will enable others skilled in the art to which it appertains to make and use the same, reference being had to the accompanying drawings, and to letters of reference marked thereon, which form a part of this specification.

I have improved the cotton and hay press in the particulars of connecting and operating the follower by means which control it with a quick action, in connection with a center-piece, which unites the follower and its toggle-lever in such manner that both the drawing in and releasing ropes of the follower operate the center controlling-piece of the toggle-levers, and give thereby an easy and quick movement to the follower, by connecting the operating-ropes of the windlass to the opposite ends of said center controlling-piece, and having an arrangement of pulleys, by which to obtain the proper action of the operating parts.

In such arrangement I provide the center controlling-piece with a center pulley, whereby to equalize the draft upon said center-piece from both the directions in which the follower-ropes act upon it. This is important, as otherwise the center-piece would be liable to draw unequally upon the connected ends of the toggle-levers.

Figure 2:
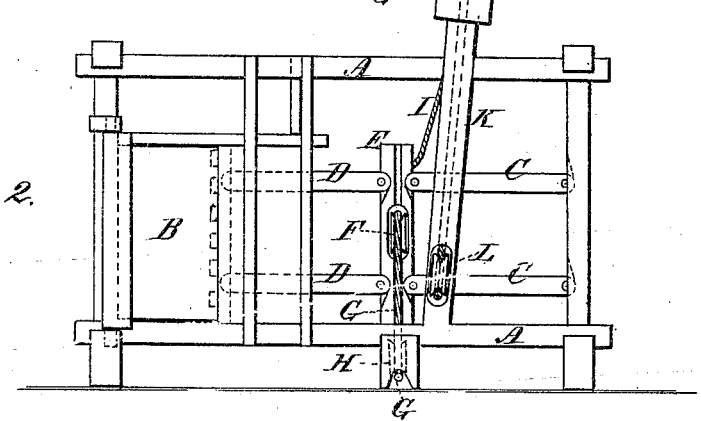
Figure 3:
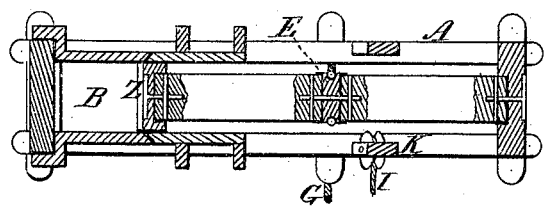
Figure 4:
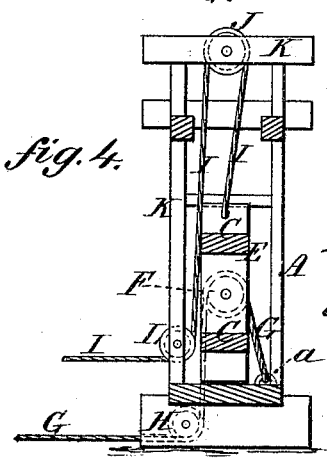

In the accompanying drawings, Figure 1 represents an elevation of my improved press, showing the follower withdrawn; Fig. 2, a similar view, showing the follower in its extreme pressing position; Fig. 3, a section of the follower, levers, and their jointing center-piece; and Fig. 4 is a section, showing the manner of operating the traversing center-piece of the toggle-levers.

The frame A and the press-box B, with its doors and other proper appliances, may be made in the usual or any approved manner best adapted to my improvement. Four levers, C C and D D, connect the follower with the outer end or head-piece of the main frame, and these are united, by strong joints or hinges, to the outer side of the follower Z, near each end, and to the head-piece, while their inner ends are not joined to each other, as ordinary toggle-joint levers, but to an intermediate or central union-piece, E, to the opposite sides of which they are jointed or hinged, and which, as the levers are flexed and straightened, moves therewith across the frame and at right angles to the movement of the follower. This gives the advantage of applying the power to the toggle-levers directly at their point of union, and crosswise of their general direction, and makes a compact and strong connection of the levers, with the advantage of a comparative short and quick movement of the cross traversing center-piece, bringing the power of the follower directly upon the same connection by which the power is applied and released, and in a direction directly across said center-piece. The movement of the center-piece E controls the movement of the follower and its levers. To do this I utilize the center-piece as the means of applying the power by combining therewith a strong pulley, F, arranged, in the example shown, between the toggle-levers, and over which the windlass-rope G passes, having its end connected with one side of the frame at a, Fig. 4, and passing from the center pulley F over another pulley, H, fixed in the same side of the frame on a line with the center traversing-piece. By this arrangement the pressing action of the follower is made in bringing the toggle-levers in line with each other. A rope, I, connects the other end of the traversing center-piece, and, passing over a pulley, J, carried by a strong frame, K, at the opposite end of the frame, and over a pulley, L, in said frame K, at a point near the pulley from which the first rope G leads. By this arrangement the follower is withdrawn from its pressing action, and by means of the same windlass, to which both the ropes are connected, so that the winding of one will unwind the other, drawing the center-piece back and forth across the frame in raising and lowering the follower, in which operation the levers C C carry the center-piece, which, in turn, carries the follower.

I have represented my press as constructed for use in a horizontal position, but it is obvious that it may be used as well in a vertical position.

I claim—

In combination with the center-piece E, the toggle-levers C D, pulleys F H, and rope G, of the pulleys J L, arranged in the frame, and the windlass-rope I, connected with the center-piece, whereby both the drawing and releasing ropes of the follower operate said center-piece.

In testimony that I claim the foregoing I have affixed my signature in presence of two witnesses.

ZACHARIAH S. FREEMAN.

Witnesses:
WM. JURRELL,
W. H. GEORGE.